United States Patent
Buri et al.

(10) Patent No.: US 8,573,376 B2
(45) Date of Patent: Nov. 5, 2013

(54) MOTOR VEHICLE GEARBOX WITH A HYDRODYNAMIC RETARDER

(75) Inventors: Gerhard Buri, Markdorf (DE); Bernhard Grupp, Weingarten (DE)

(73) Assignee: ZF Friedrichshafen AG, Friedrichshafen (DE)

(*) Notice: Subject to any disclaimer, the term of this patent is extended or adjusted under 35 U.S.C. 154(b) by 90 days.

(21) Appl. No.: 13/378,559

(22) PCT Filed: Jun. 7, 2010

(86) PCT No.: PCT/EP2010/057881
§ 371 (c)(1),
(2), (4) Date: Dec. 15, 2011

(87) PCT Pub. No.: WO2011/000664
PCT Pub. Date: Jan. 6, 2011

(65) Prior Publication Data
US 2012/0138418 A1    Jun. 7, 2012

(30) Foreign Application Priority Data
Jul. 1, 2009    (DE) .......................... 10 2009 027 390

(51) Int. Cl.
*F16H 37/06* (2006.01)
*F16H 63/44* (2006.01)
*B60T 1/087* (2006.01)

(52) U.S. Cl.
USPC ........................................... 192/216; 74/15.2

(58) Field of Classification Search
USPC .................. 74/411.5, 15.2; 192/216
See application file for complete search history.

(56) References Cited

U.S. PATENT DOCUMENTS

| | | | | |
|---|---|---|---|---|
| 4,191,072 A * | 3/1980 | Ehrlinger et al. | ............... | 475/68 |
| 4,819,774 A * | 4/1989 | Bieber | ............... | 192/216 |
| 5,501,641 A * | 3/1996 | Koellermeyer et al. | ....... | 475/107 |
| 5,661,998 A * | 9/1997 | Genise | ............... | 74/335 |
| 6,159,123 A * | 12/2000 | Gumpoltsberger | ........... | 475/116 |
| 6,612,960 B1 * | 9/2003 | Hoyer | ............... | 475/302 |
| 8,037,776 B2 | 10/2011 | Steinborn et al. | | |
| 2005/0241423 A1 * | 11/2005 | Muetzel et al. | ............... | 74/325 |
| 2008/0092676 A1 * | 4/2008 | Steinborn et al. | ............... | 74/15.2 |

FOREIGN PATENT DOCUMENTS

| | | |
|---|---|---|
| DE | 38 37 142 A1 | 5/1989 |
| DE | 41 08 658 A1 | 9/1992 |
| DE | 43 06 743 A1 | 9/1994 |
| DE | 197 51 776 A1 | 5/1999 |
| DE | 19751776 A1 * | 5/1999 |
| DE | 101 56 186 A1 | 6/2003 |
| DE | 10 2006 050 009 A1 | 4/2008 |
| EP | 1810867 A2 * | 7/2007 |
| EP | 1 916 448 A2 | 4/2008 |

OTHER PUBLICATIONS

German Search Report issued in corresponding German application mailed Jun. 4, 2013.

* cited by examiner

*Primary Examiner* — Richard M. Lorence
*Assistant Examiner* — Lillian Nguyen
(74) *Attorney, Agent, or Firm* — Davis & Bujold, PLLC; Michael J. Bujold

(57) ABSTRACT

A motor vehicle gearbox having a hydrodynamic retarder (12) and at least one connection (23) for a power take-off drive. The retarder (12) can be driven by an output shaft (5) of the gearbox (1) via a spur gear stage (11) having a drive gear (9) and an output gear (10). The drive gear (9) engages with at least one further output gear (13) by which at least one further power take-off drive (17, 21) can be driven.

12 Claims, 2 Drawing Sheets

MOTOR VEHICLE GEARBOX WITH A HYDRODYNAMIC RETARDER

This application is a National Stage completion of PCT/EP2010/057881 filed Jun. 7, 2010, which claims priority from German patent application serial no. 10 2009 027 390.5 filed Jul. 1, 2009.

FIELD OF THE INVENTION

The invention relates to a gearbox of a motor vehicle having a hydrodynamic, and a method for operating the gearbox.

BACKGROUND OF THE INVENTION

Motor vehicles having retarders as a hydrodynamic brake are known, where a distinction is made between primary and secondary retarders: primary retarders are located on the engine side of the drive train, and secondary retarders are located on the gearbox side. Secondary retarders are flanged to the gearbox or are integrated into the gearbox housing, and are driven by the output shaft of the gearbox via a step-up stage. It is also known to equip gearboxes with a connection for a power take-off drive, where it can be operated as a clutch-dependent connection, i.e., the connection for the operating the power take-off drive can be taken into operation when the internal combustion engine of the motor vehicle runs and the clutch between the internal combustion engine and the gearbox is engaged.

A motor vehicle gearbox having a hydrodynamic retarder is known from the applicant's document DE 101 56 186 A, where the retarder is connected to the output shaft of the gearbox via an angle drive. The disclosed gearbox comprises a drive shaft, a main shaft, and two countershafts, where the drawing shows a further shaft in extension of the upper countershaft that can be considered as a drive shaft for a power take-off drive.

The applicant's document DE 41 08 658 A1 discloses a motor vehicle gearbox having a hydrodynamic retarder which is driven by the output shaft of the gearbox via a spur gear stage, of a so-called step-up stage.

SUMMARY OF THE INVENTION

The problem addressed by the current invention is to create at least one further connection for a power take-off drive in a gearbox of the initially named type which can be used in as many different ways as possible. The problem also addressed by the invention is to provide a method for operating a gearbox, particularly for different uses of the power take-off drive.

According to the invention, at least one further power take-off drive can be driven by the drive gear, the so-called step-up gear of the step-up stage. Preferably, in addition to the pinion for the drive of the retarder, a further pinion meshes with the step-up gear. This results in the advantage that the gearbox has a connection for a further power take-off drive which can be accommodated in a minimal construction space.

According to a preferred embodiment, the further output gear or the second pinion is disposed on a pinion shaft driving a power take-off shaft.

According to a further preferred embodiment, a clutch is disposed between the power take-off shaft for the further power take-off drive and the pinion shaft; the power take-off shaft can be coupled to the pinion shaft via this clutch, that is, the further power take-off drive can be engaged or disengaged via the first clutch. In the case of engaging the further power take-off drive, the operation is drive-dependent, that is, it depends on whether the vehicle is driving.

According to a further preferred embodiment, the further power take-off drive can be connected to an additional power take-off drive via a spur gear stage. This results in a connection for an additional power take-off drive, where the transmission ratio is preferably a step-up ratio.

According to a further preferred embodiment, the power take-off drive can be coupled to the further power take-off drive via a further spur gear stage and a second clutch. Alternatively, the further spur gear stage comprises an intermediate gear, whereby the direction of rotation is reversed so that the power take-off drive and the further power take-off drive rotate in the same direction.

According to a further preferred embodiment, the power take-off drive can be driven via a gearbox shaft, preferably a countershaft, where a third clutch is located in the power take-off drive train. Thereby, the power take-off drive can be switched on and operated clutch-dependent, or decoupled from the gearbox shaft and operated drive-dependent via the further power take-off drive.

According to a further preferred embodiment, a mechanical, electrical or electronic control unit monitors the shifting state of the first, second and third clutch. With this, different operating and switching states of the three power take-off drives can be initiated and controlled.

According to the invention, in a method for operating the gearbox, the power take-off drive can be operated clutch-dependent, or drive-dependent, or clutch and drive dependent. By actuating the clutch via an electronic control unit, the power take-off drive can be switched so that it can be operated in one case while the vehicle is parked with the engine running, and in another case while the vehicle is moving, or while the vehicle is moving or parked

BRIEF DESCRIPTION OF THE DRAWINGS

An embodiment of the invention is illustrated in the drawing and is described in detail in the following, whereby other features and/or benefits may be derived from the description and/or drawing. They show.

DETAILED DESCRIPTION OF THE PREFERRED EMBODIMENTS

Figure 1:
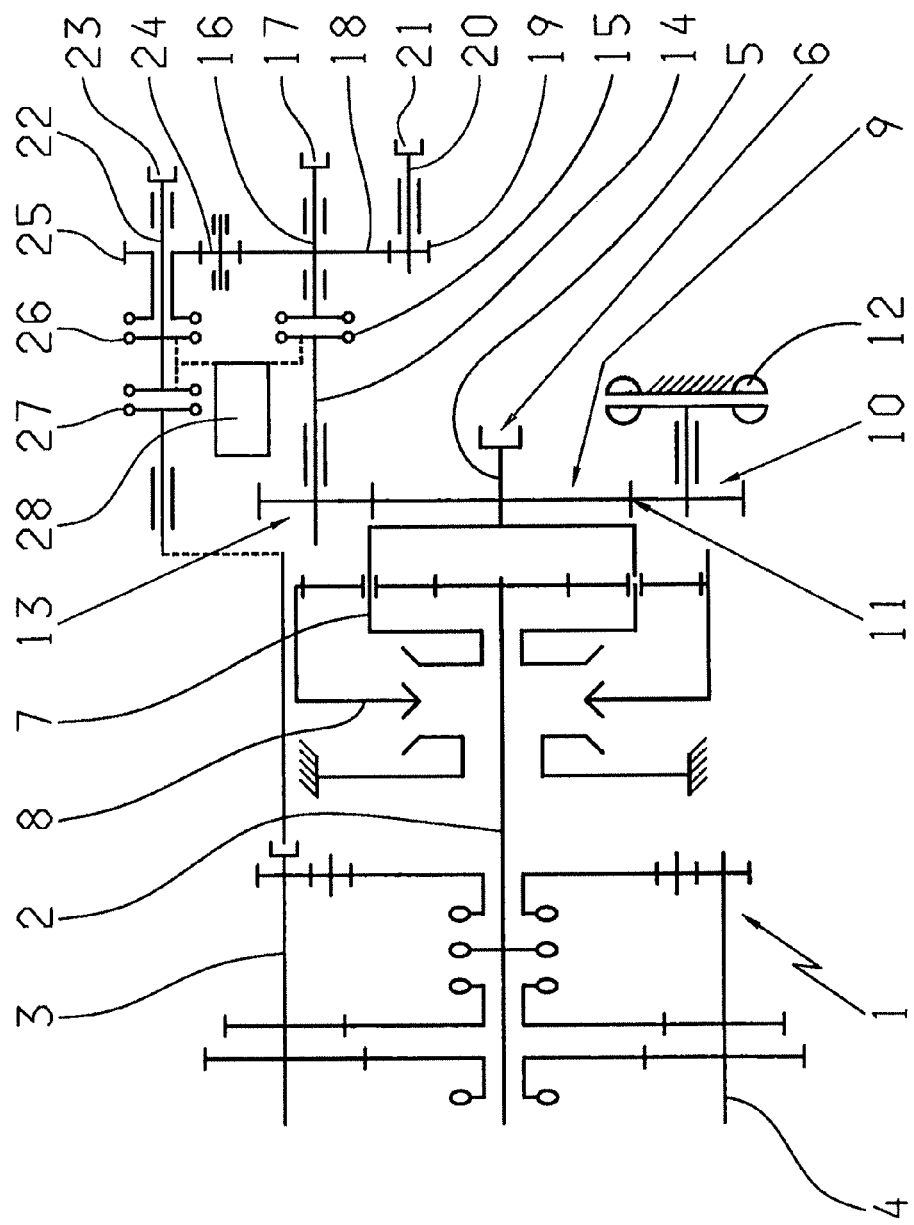
FIG. 1 a gearbox having connections for power take-off drives.

FIG. 1 shows the output side of a gearbox 1 which comprises a main shaft 2, two countershafts 3, 4 and an output shaft 5 having an output flange 6. The gearbox 1 that is not completed represented, corresponds substantially to the gearbox in the document DE 101 56 186 A1 cited above. The main shaft 2 is connected to the output shaft 5 via a planetary gear set 7, which can be shifted to different transmission ratios via a shifting device 8. A drive gear 9 is disposed on the output shaft 5 in a rotationally fixed manner, and engages with the output gear 10, and forms a spur gear stage 11 for driving a retarder 12. The drive gear 9 is also designated as step-up gear 9 and the spur gear stage 11 as step-up stage 11 or booster 11, because the drive of the retarder 12 uses a step-up ratio.

According to the invention, the step-up gear 9 engages with a further power take-off gear 13 which is designated also as power take-off pinion 13. The power take-off pinion 13 drives a pinion shaft 14, which can be connected to, or separated from, a power take-off shaft 16 via a first clutch 15. The power take-off shaft 16 comprises a connection 17 that can be connected to a further power take-off drive, not shown. The power take-off shaft 16 drives via a spur gear stage 18/19 an additional power take-off shaft 20 having a connection 21 for an additional power take-off drive, not shown. The power take-off shaft 16 is connected to a power take-off shaft 22, which comprises a connection 23 for a power take-off drive, not shown. The power take-off shaft 22 is driven via the gears 18, 24, 25, and can be engaged via a second clutch 26. The gear 24 is designed as an intermediate gear, so that the connections 17, 23 for the power take-off drives have the same direction of rotation. The power take-off shaft 22 can be connected via a third clutch 27 to the countershaft 3, also called gearbox shaft 3, of the gearbox 1. This results in an additional drive possibility for the connection 23, which can be operated clutch-dependent with an engaged third clutch 27 and disengaged second clutch 26. The shift state of the first, second and third clutch 15, 26, 27 is monitored by a control unit 28 that is indicated by dotted signal lines.

The three power take-off drives 17, 21, 23 can be operated as follows: the power take-off drives 17, 21 can be operated drive-dependent; in this case, the clutch 15 is engaged and clutch 26 is disengaged. However, the power take-off drives 17, 21 can be operated clutch-dependent; in this case, the clutch 15 is disengaged, and clutches 26, 27 are engaged.

Furthermore, the power take-off drive 23 can be operated clutch-dependent by engaging the clutch 27, and drive-dependent by disengaging the clutch 27 and engaging the clutches 26, 15.

Figure 1A:
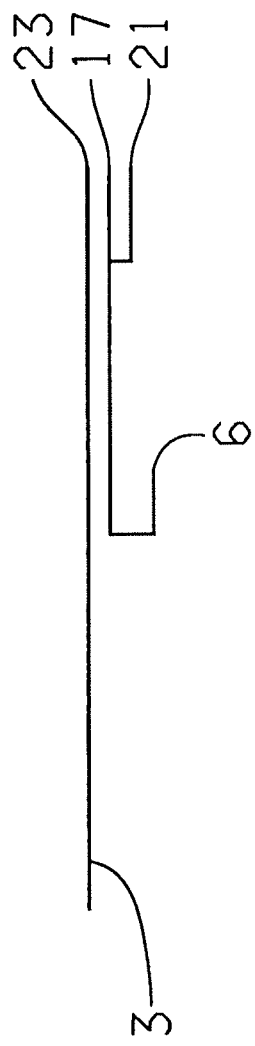
FIG. 1a, 1b, 1c a diagram for the power flow during operation of the power take-off drive.
Figure 1B:
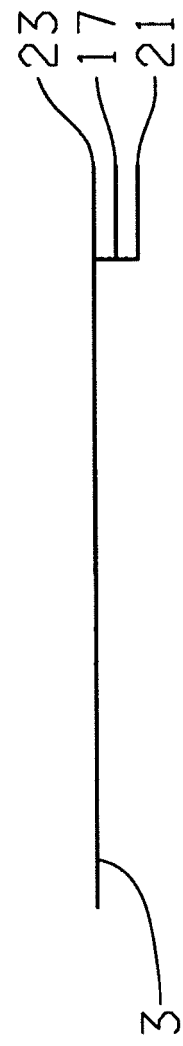
Figure 1C:
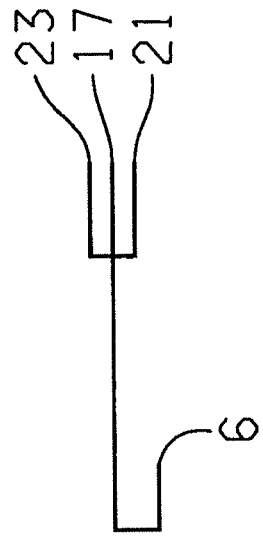

FIG. 1a, 1b, 1c show three different possible power flows during the operation of the three power take-off drives or connections 23, 17, 21, which are each numbered sequentially from top to bottom. FIG. 1a shows an upper solid line to the power take-off drive 23, that is, with the clutch 27 engaged and clutch 26 disengaged, there is a drive from the countershaft 3 through to the connection 23. At the same time, the clutch 15 is engaged so that the power take-off drives 17, 21 can be operated drive-dependent.

FIG. 1b shows the power flow in the case of engaged clutches 27, 26 and disengaged clutch 15, that is, all three power take-off drives 23, 17, 21 are operated clutch-dependent.

FIG. 1c shows the power flow in the case of a disengaged clutch 27 and engaged clutch 15, that is, the three power take-off drives 23, 17, 21 are operated drive-dependent.

REFERENCE CHARACTERS 1 gearbox
2 main shaft
3 countershaft
4 countershaft
5 output shaft
6 output flange
7 planetary gear set
8 shifting device
9 drive gear (step-up gear)
10 output gear
11 spur gear stage (step-up stage)
12 retarder
13 further output gear (power take-off pinion)
14 pinion shaft
15 first clutch
16 power take-off shaft
17 connection for the further power take-off drive
18 gear
19 gear
20 power take-off shaft
21 connection for the additional power take-off drive
22 power take-off shaft
23 connection for the power take-off drive
24 intermediate gear
25 gear
26 second clutch
27 third clutch
28 control unit

The invention claimed is:

1. A gearbox of a motor vehicle comprising:
a hydrodynamic retarder (12) and at least a first power take-off drive (23),
the retarder (12) being drivable by an output shaft (5) of the gearbox (1) via a first spur gear stage (11),
the first spur gear stage (11) having a drive gear (9) and an output gear (10), and
the drive gear (9) engaging at least one further output gear (13) by which at least a second power take-off drive (17, 21) is drivable.

2. The gearbox according to claim 1, wherein the further output gear (13) is disposed on a pinion shaft (14).

3. The gearbox according to claim 2, wherein the pinion shaft (14) is connectable to a power take-off shaft (16) which comprises on an output side thereof a connection (17) for the second power take-off drive.

4. The gearbox according to claim 2, wherein a first clutch (15) facilitates engaging and disengaging of a power take-off shaft (16) of the second power take-off drive.

5. The gearbox according to claim 2, wherein a power take-off shaft (16) is connected, via a second spur gear stage (18, 19), to an additional power take-off shaft (20).

6. The gearbox according to claim 2, wherein a power take-off shaft (16) is connectable, via a second spur gear stage (18, 24, 25) and a clutch (26), to the first power take-off drive (23).

7. The gearbox according to claim 6, wherein the second spur gear stage (18, 25) comprises an intermediate gear (24).

8. The gearbox according to claim 1, wherein the first power take-off drive (23) is drivable by one of a gearbox shaft and a countershaft (3) of the gearbox (1).

9. The gearbox according to claim 8, wherein a clutch (27) facilitates shifting of the first power take-off drive (23).

10. The gearbox according to claim 1, wherein one of a mechanical, an electrical or an electronic control unit (28) is provided for monitoring a shift state of clutches (15, 26, 27).

11. A method of operating a gearbox (1) of a motor vehicle comprising a first power take-off drive (17, 21, 23), a hydrodynamic retarder (12) and at least one power take-off connection (23) for the first power take-off drive, the retarder (12) being drivable by an output shaft (5) of the gearbox (1) via a spur gear stage (11), the spur gear stage having a drive gear (9) and an output gear (10), the drive gear (9) engaging at least one further output gear (13) by which at least a second power take-off drive (17, 21) is drivable, the method comprising the step of:
operating the first power take-off drive and the second power take-off drive (17, 21, 23) either clutch-dependent or drive-dependent.

12. A gearbox of a motor vehicle comprising:
a hydrodynamic retarder and a first power take-off shaft;
a gearbox output shaft that drives an output drive;
a first spur gear stage comprises a drive gear and a first output gear, the drive gear is rotationally fixed to the gearbox output shaft so as to prevent relative rotation therebetween, and the drive gear engages the first output gear and drives the hydrodynamic retarder via the first output gear; and the drive gear engages a second output gear and drives at least a second power take-off shaft via the second output gear.

* * * * *